United States Patent [19]
Tamanti et al.

[11] Patent Number: 6,157,453
[45] Date of Patent: Dec. 5, 2000

[54] PROCESS FOR DISCRIMINATING THE COLOR OF A SURFACE AND APPARATUS FOR IMPLEMENTING THE PROCESS

[75] Inventors: Maria Lisa Tamanti, Cesena; Gianfranco Righi, Modena, both of Italy

[73] Assignee: Datalogic S.p.A., Bologna, Italy

[21] Appl. No.: 09/288,319

[22] Filed: Apr. 8, 1999

[51] Int. Cl.[7] ....................................................... G01J 3/50
[52] U.S. Cl. ........................... 356/406; 356/425; 250/226
[58] Field of Search ..................................... 356/402, 405, 356/406, 407, 420, 425; 250/226

[56] References Cited

U.S. PATENT DOCUMENTS

| | | |
|---|---|---|
| 4,678,338 | 7/1987 | Kitta et al. . |
| 4,917,500 | 4/1990 | Lugos . |
| 5,021,645 | 6/1991 | Satula et al. . |
| 5,229,841 | 7/1993 | Taranowski et al. ................... 356/406 |
| 5,325,386 | 6/1994 | Jewell et al. .............................. 372/50 |

*Primary Examiner*—F. L. Evans
*Attorney, Agent, or Firm*—Sughrue, Mion, Zinn, Macpeak & Seas, PLLC

[57] ABSTRACT

The invention relates to a process for discriminating the color of a surface, comprising the steps of acquiring at least a colored acquisition surface, comparing the color of a detecting surface with said at least one color previously acquired so that said color can be recognized. In particular, the acquisition step comprises the steps of sequentially illuminating the acquisition surface with each of three light beams corresponding to three primary colors, each of said light beams being generated by a respective emission source supplied with a supply current IR, IG, IB; picking up by means of a light-receiving element the light scattered from the illuminated acquisition surface; generating an electric signal VR, VG, VB proportional to the luminous intensity of the picked-up light, as the acquisition surface is being illuminated with each of the three beams and controlling the supply current IR, IG, IB of the emission sources such that at least two of the electric signals VR, VG, VB generated are identical with each other within a predetermined tolerance margin.

55 Claims, 6 Drawing Sheets

PROCESS FOR DISCRIMINATING THE COLOR OF A SURFACE AND APPARATUS FOR IMPLEMENTING THE PROCESS

BACKGROUND OF THE INVENTION

This invention relates to a process for discriminating the color of a surface, and to an apparatus for implementing the process.

More particularly, the invention relates to a process and an apparatus for discriminating the color of a surface by comparison with a previously acquired reference color. The invention further relates to a process for discriminating a range of colors and/or a plurality of colors on a surface.

Throughout this description and the appended claims, the expression "color range" will be used to indicate a plurality of different hues of one color (e.g., for the red color, a range of variation of red hues from light red to deep red).

In object sorting and handling systems, an ability to "recognize" the surface color of the objects may sometimes be useful to facilitate and speed up the object sorting and handling operations. For the purpose, several process for discriminating the color of a surface have been proposed heretofore which all comprise substantially two basic steps, both to be carried out on the same apparatus (also referred to as the "color discriminator" hereinafter), namely: a first "acquisition" step whereby the apparatus is set, manually or automatically, for a reference color, followed by a "recognition" step whereby the color of the object surface being scanned is compared with the previously acquired reference color to check that they are the same, within an optionally adjustable tolerance margin.

More particularly, the acquisition step consists of illuminating with a suitable light source a colored acquisition surface which includes the color to be recognized, and then picking up, onto a light-receiving element, light scattered from said surface so as to generate electric signals which are proportional to the luminous intensity of the picked-up light. These signals are then suitably processed to calculate and store parameters representing the color of the illuminated acquisition surface.

The recognition step consists of using the same apparatus, as previously set during the acquisition step, to illuminate the surface of the object bearing the color to be discriminated and generate electric signals proportional to the luminous intensity of light scattered back from such surface. These signals are then processed to calculate parameters representing the surface color of the illuminated object; these parameters are ultimately compared with those previously stored during the acquisition step to check that they are the same within a predetermined tolerance margin, thereby to recognize the surface color of the illuminated object.

For both the acquisition and recognition steps, the processing of the electric signals generated by the light-responsive element is based on the detection of the three components $V_R$, $V_G$, $V_B$ of the three primary colors—red, green and blue—emitted from the three LEDs.

Among the prior color discriminators capable of implementing a process such as that above described, the so-called "solid-state" ones are of particular interest, which additionally to incorporating inexpensive small-size components, can discriminate the color of a surface regardless of the surface distance from the discriminator. Such discriminators employ, as the light sources, three separate emission LEDs, respectively for the red, green and blue colors, and as the light-receiving element, a standard photodiode or phototransistor having a sufficiently wide sensibility in the visible range. In such discriminators, the emission LEDs are supplied by impulse with respective supply currents $I_R$, $I_G$, $I_B$, such that, at each current impulse supplied, corresponding electric signals $V_R$, $V_G$, $V_B$ are generated by the photodiode so as that their sum is equal to a predetermined reference value (preferably, the white color). The color is then recognized by measuring the amounts of red, green and blue scattered from the surface of the object being scanned (i.e., measuring the values of the signals $V_R$, $V_G$, $V_B$ generated during normal operation of the discriminator).

A color discriminator of the above type, while substantially achieving its objective, still does not allow discrimination of those colors wherein at least one of the color components $V_R$, $V_G$, $V_B$ is much smaller than the two others (consider, for instance, the red, green and blue colors themselves, for which the respective color components of that color are much larger than the two others). In this situation, the discriminator above described is little responsive to variations in the other two colors, and therefore, cannot provide accurate discrimination of the different hues of these colors.

Furthermore, there are instances of one component being much smaller than the two others. Here again, the discriminator response to varying hues of that color is poor.

SUMMARY OF THE INVENTION

The underlying technical problem of this invention is to provide an efficient and accurate way of discriminating any color of any surface.

According to a first aspect, the invention provides a process for discriminating the color of a surface, comprising the steps of:

a) acquiring at least one color of a colored acquisition surface;

b) comparing the color of a detecting surface with said at least one color previously acquired, so that said color can be recognized;

wherein the acquisition step a) comprises the following steps:

a1) sequentially illuminating the acquisition surface with each of three light beams corresponding to three primary colors, each of said light beams being generated by a respective emission source supplied with a supply current IR, IG, IB;

a2) picking up by means of a light-receiving element the light scattered from the illuminated acquisition surface;

a3) generating an electric signal VR, VG, VB proportional to the luminous intensity of the picked-up light, as the acquisition surface is being illuminated with each of the three beams;

characterized in that it further comprises the step of:

a4) controlling the supply current IR, IG, IB of the emission sources such that at least two of the electric signals VR, VG, VB generated are identical with each other within a predetermined tolerance margin.

Advantageously, the process of this invention allows an accurate discrimination of any color (and/or any color hue) on a surface, regardless of whether this is a color wherein one (or two) component(s) is(are) much smaller than the two others(the other), thereby overcoming the limitations of the above-described prior process related, in particular, to the impossibility to discriminate colors wherein one or two color components are much smaller than the others.

As a matter of fact, by the process of this invention, a color whichever is characterized by means of a signal triplet $V_R$, $V_G$, $V_B$ wherein at least two signals are identical with each other; thus, colors and/or varying color hues can be discriminated in an accurate manner which would not otherwise be easily discriminated by the above-described prior process.

Advantageously, the step of acquiring the color to be subsequently recognized is carried out individually for each discriminating apparatus and for each color to be discriminated. In particular, the recognition of a predetermined color is performed according to parameters representative of that color, which are suitably adjusted and stored in the same discriminating apparatus to be subsequently used for recognizing such color. This allows to overcome the problems due to aging of the optical components mounted on the discriminating apparatus and the known phenomena of spreading of certain basic operational parameters of said components, which would otherwise result in the color discriminating process being generally unreliable.

Preferably, the supply current $I_R$, $I_G$, $I_B$ of the emission sources is controlled in the inventive process such that the electric signals $V_R$, $V_G$, $V_B$ (i.e., the individual color components) generated are all identical with one another, within a predetermined tolerance margin. Advantageously, this enables colors wherein one (or two) of the three color components is much smaller than the others (the other) to be accurately discriminated; in addition, being the variations of each color component all equally discriminated, the different hues of a same color whichever can also be accurately discriminated.

Advantageously, the supply current $I_R$, $I_G$, $I_B$ of the emission sources is controlled such that the electric signals $V_R$, $V_G$, $V_B$ generated are all equal, within a predetermined tolerance margin, to a predetermined reference value. Preferably, this reference signal is set at one half the reference voltage used by an analog-to-digital converter which is arranged to convert the analog signal generated by the light-receiving element to a digital signal for subsequent processing.

This form of control advantageously allows the working field depth of the apparatus employed to implement the inventive process to be greatly increased. This is essentially owed to the fact that the values of signals $V_R$, $V_G$, $V_B$ utilized are one half the highest voltage value to be generated by the light-receiving element; accordingly, the voltage generated by the light-receiving element can be increased and/or decreased to suit the amplitude of the signals $V_R$, $V_G$, $V_B$ generated during the recognition step, by increasing and/or decreasing the distance of the discriminating apparatus from the surface bearing the color to be recognized. This affords enhanced color discriminating capability even in those cases where the signals generated by the light-receiving element are very weak (e.g., because originating from dark colors on a far surface) and/or very strong (e.g., because originating from light colors on a near surface).

Preferably, the acquisition procedure according to this invention is carried out in a simple, fast and systematic manner using a binary search algorithm for the supply currents of the three emission sources. According to this algorithm, step a4) further includes the following steps: a41) checking if each of the digital signals $V_R$, $V_G$, $V_B$ has its value within a predetermined range of values defined by said reference value plus/minus a predetermined tolerance margin and:

a41a) if so, storing the values of said digital signals $V_R$, $V_G$, $V_B$ a41b) if not so, iteratively varying the supply current within a predetermined range of current values, and repeating step a41) at each iteration.

In particular, step a41) preferably includes the following steps:

a411) setting the value of the supply current IR, IG, IB of the emission source which is supplied first at a actual value equal to the highest value in a predetermined range of supply current values;

a412) checking if the value of the first of the signals VR, VG, VB to be generated is lower than an upper limiting value of said predetermined range of values and:

a412a) if so, checking that the value of said signal VR, VG, VB is higher than a lower limiting value of said predetermined range of values, and if so, storing the actual value of the supply current IR, IG, IB and iteratively repeating the steps from a411) for the emission source coming next in the supply sequence;

a412b) if not so, reducing the value of said supply current IR, IG, IB by a predetermined factor, and iteratively repeating step a412).

Where the above-described control cannot be implemented, the supply current $I_R$, $I_G$, $I_B$ of the emission sources is controlled such that the electric signals $V_R$, $V_G$, $V_B$ generated are all equal, within a predetermined tolerance margin, to the value of the smallest among them. In particular, if the check of step a412a) gives a negative result, a step is carried out to check if the actual value of the supply current $I_R$, $I_G$, $I_B$ is different from the highest value in the predetermined range of current values and:

if the check of step a412a) gives a negative result, a step is carried out to check if the actual value of the supply current IR, IG, IB is different from the highest value in the predetermined range of current values and:

if so, taking as the supply current value a value equal to one half the difference between the highest value in the predetermined range of current values and the actual value of the supply current IR, IG, IB and repeating the steps from a412);

if not so, carrying out the following steps:

a412a1) iteratively repeating the steps from a411) for the emission source coming next in the supply sequence;

a412a2) setting, as the reference value, the value of the smallest of the digital signals VR, VG, VB and repeating the steps from a41).

According to a particularly advantageous alternative embodiment of the process of this invention, step a412a2) is preceded by a step of checking if the amplification level can be raised and:

if so, raising by a predetermined interval said amplification level and iteratively repeating the steps from a411);

if not so, carrying out step a412a2).

In this way, a high capability for discrimination of colors can be ensured even in situations where the signals generated by the light-receiving element are too weak (e.g., because originating from light colors on a far surface) or too strong (e.g., because originating from dark colors on a near surface), thereby increasing both the field depth and the precision of the color discriminating process.

Preferably, where none of the above described controls can be implemented, the supply current $I_R$, $I_G$, $I_B$ of the emission sources is controlled such that only two of the electric signals $V_R$, $V_G$, $V_B$ generated are equal to each other, within a predetermined tolerance margin, and higher than a predetermined minimum value. In particular, step a412a2) further includes the following steps:

checking if the reference setting value is higher than a first predetermined minimum value and:

if so, repeating the steps from a41);
if not so, setting the smaller of the remaining two of the signals $V_R$, $V_G$, $V_B$ as the reference value, and repeating the steps from a41).

Preferably, said first predetermined minimum value is one third the value of the smallest acceptable sum of the signal $V_R$, $V_G$, $V_B$ values.

If the check of step a412a2) gives a negative result, the following steps are carried out specifically:
checking if the reference setting value is higher than a second minimum value, and
if so, setting as the reference value for the smallest of the digital signals $V_R$, $V_G$, $V_B$, the actual value of that signal, and as the reference value for the remaining two signals the value of the smaller of the two actual remaining signals, and repeating the steps from a41);
if not so, indicating an error.

Preferably, said second predetermined minimum value is one half the difference between the value of the smallest acceptable sum of the signal $V_R$, $V_G$, $V_B$ values and the value of the smallest of the signals $V_R$, $V_G$, $V_B$.

Thus, the acquisition procedure above described terminates with the determination of the supply currents of the three emission sources or with an error indication. If the determination of the supply currents is successful, the process of this invention advantageously continues through the following steps of processing the electric signals $V_R$, $V_G$, $V_B$ generated correspondingly with the aforesaid supply currents:
making a plurality of measurements of VR, VG, VB, using the stored supply current values IR, IG, IB;
calculating the arithmetical mean of the values of the signals VR, VG, VB corresponding to each stored supply current IR, IG, IB;
calculating the minimum and maximum limiting values of the digital signals VR, VG, VB by respectively adding and subtracting to/from said arithmetical mean a predetermined error, selected to suit specific application requirements.

Advantageously, this error is calculated according to the noise inherently present on the signal generated by the light-receiving element and/or introduced during the subsequent amplifying, converting, and processing steps. Even more advantageously, the error also takes account of the spread phenomena of the optical components mounted on the discriminating apparatus (which involves, for instance, variations in the incoming signal with changing temperature). Thus, a range of significant values can be defined for the signals generated by the light-receiver which effectively removes the risk of making, during the subsequent recognition step, erroneous or inaccurate discriminations as a result of the errors that affect the various steps of the process.

Preferably, the process of this invention further comprises the following steps:
defining reference parameters R, G, B respectively as the ratio of the value of each signal $V_R$, $V_G$, $V_B$ to their sum;
calculating, for each reference parameter, an upper (lower) limit respectively defined as the ratio of the maximum (minimum) value of the signal $V_R$, $V_G$, $V_B$ considered to the sum of that maximum (minimum) value plus the minimum (maximum) values of the other two signals $V_R$, $V_G$, $V_B$.

Having thus completed the acquisition step, the process of this invention provides for a step of recognizing the previously acquired color, to be carried out on the same discriminating apparatus. Advantageously, the recognition step b) includes the following steps:
b1) sequentially illuminating, with the aforesaid three light beams, the detecting surface bearing the color to be recognized;
b2) picking up, by means of the light-receiving element, the light scattered from said illuminated surface;
b3) generating an electric signal $V_R'$, $V_G'$, $V_B'$ proportional to the luminous intensity of the picked-up light, as the detecting surface is being illuminated with each of the three beams;
b4) checking that at least two of the values of the electric signals $V_R'$, $V_G'$, $V_B'$ generated are equal, within a predetermined tolerance margin, to those of the electric signals $V_R$, $V_G$, $V_B$ acquired during step a).

This check is advantageously performed only on two instead of three color components. This because the sum of the three color components is equal to a predetermined value, and therefore, with two components being known, the third is univocally determined.

Preferably, step b4) includes the following steps:
b41) checking that the electric signals $V_R'$, $V_G'$, $V_B$ ' generated are lower than a predetermined saturation value and that their sum is higher a predetermined minimum value and:
b41a) if both of said checks give a positive result, carrying out step b4);
b41b) if at least one of said checks gives a negative result, indicating that the color of the surface being scanned is not recognized.

Even more preferably, step b41a) further includes the following steps:
selecting, from the signals $V_R'$, $V_G'$, $V_B'$, the two signals having the highest values;
defining, for each of the selected signals, a reference variable R', G', B' equal to the ratio of the selected signal to the sum of the signals $V_R'$, $V_G'$, $V_B'$;
checking if each of the reference variables above defined falls within a respective predetermined range of values and:
if the above check gives a positive result for both said variables, indicating that the color is recognized;
if the above check gives a negative result for at least one of said variables, indicating that the color of the surface being scanned is not recognized.

Advantageously, said predetermined range of values for the reference variables is set by the upper and lower limits of the reference parameters calculated for the signals $V_R$, $V_G$, $V_B$ during the acquisition step. Thus, the color recognition is simply and rapidly effected by numerical comparison of the reference parameters calculated during the acquisition step with the reference variables calculated during the recognition step.

According to another, most advantageous embodiment of the inventive process, if either the first or the second of the check provided in step b41) gives a negative result, a step is carried out to check if the amplification level can be varied, and
if so, the amplification level is changed by a predetermined interval, and the steps from b41) are repeated iteratively;
if not so, the color of the surface being scanned is reported as not recognized.

According to a second aspect, the invention relates to a process for discriminating a color range of a surface, characterized in that it comprises the following steps:

i) performing, as previously described, a first acquisition of a first color establishing one extreme of a color range to be recognized;

ii) storing the supply current values determined during step i);

iii) performing, as previously described and using said emission current values, a second acquisition of a second color establishing the other extreme of said color range;

iv) checking that the values of the electric signals $V_R'$, $V_G'$, $V_B'$ generated during the recognition step previously described, are the same, within a predetermined tolerance margin, as those of the electric signals $V_R$, $V_G$, $V_B$ acquired during the aforesaid acquisition steps.

According to a third aspect, the invention relates to a process for discriminating a plurality of colors on a surface, characterized in that it comprises the following steps:

performing sequentially, as previously described, a plurality of acquisitions of a plurality of colors;

each time storing the supply current values determined during the preceding step;

checking that the values of the electric signals $V_R'$, $V_G'$, $V_B'$ generated during the recognition steps previously described, are the same, within a predetermined tolerance margin, as those of the electric signals $V_R$, $V_G$, $V_B$ acquired during the aforesaid acquisition steps.

Lastly, according to a fourth aspect, the invention relates to an apparatus for discriminating the color of a surface, comprising:

three emission sources of three light beams corresponding to three primary colors being respectively supplied with a supply current $I_R$, $I_G$, $I_B$;

a light-receiving element adapted to receive light scattered from the illuminated surface and generate an electric signal $V_R$, $V_G$, $V_B$ which is proportional to the luminous intensity of the picked-up light;

characterized in that it comprises a microcontroller assembly for controlling the supply current $I_R$, $I_G$, $I_B$ of the emission sources such that at least two of the electric signals $V_R$, $V_G$, $V_B$ generated are identical with each other, within a predetermined tolerance margin.

BRIEF DESCRIPTION OF THE DRAWINGS

Further features and advantages of the invention will be more clearly apparent from the following detailed description of a preferred embodiment thereof, given with reference to the accompanying drawings. In the drawings.

DETAILED DESCRIPTION OF THE INVENTION

Figure 1:
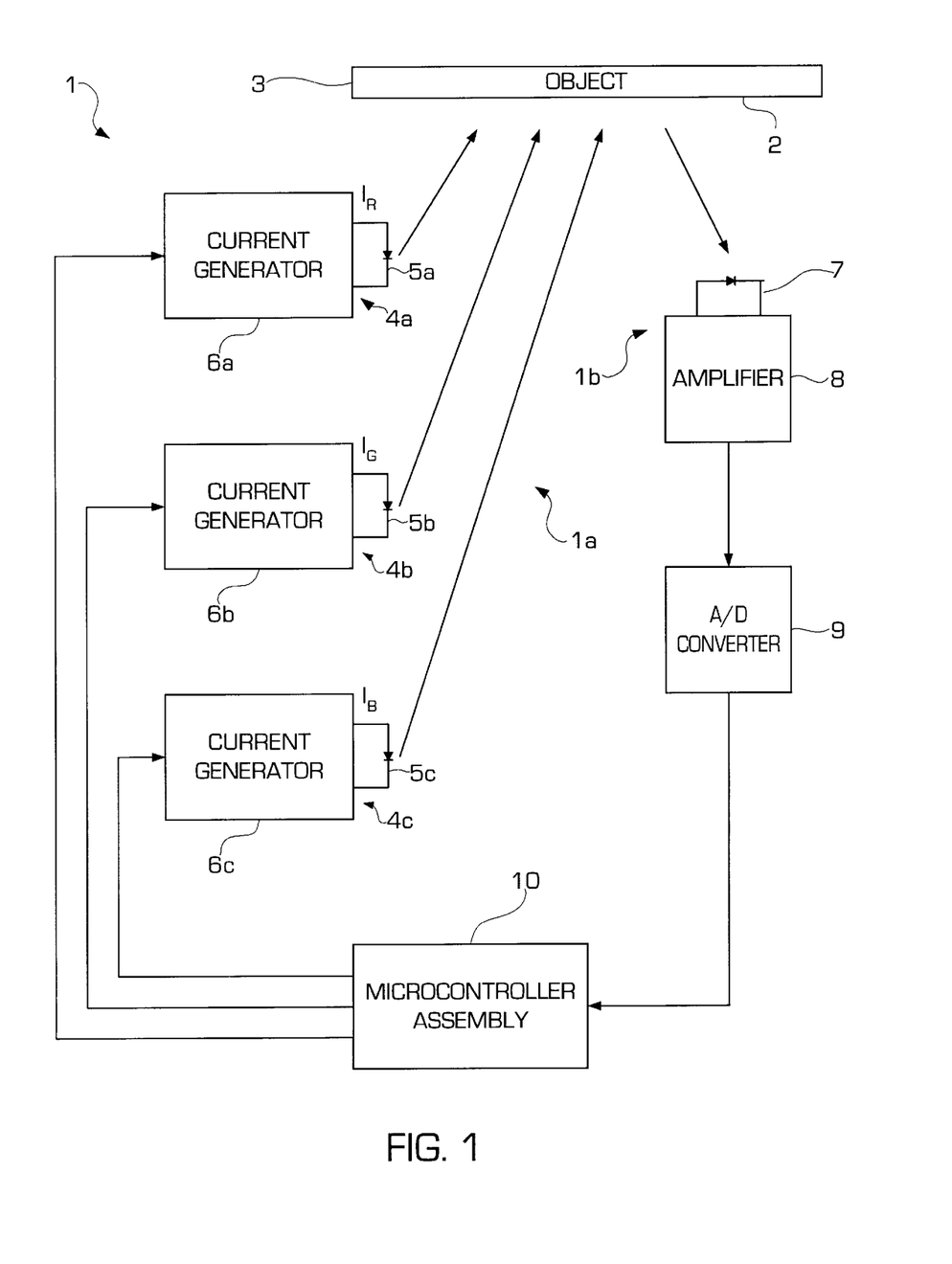
FIG. 1 is a block diagram illustrating a first embodiment of an apparatus for discriminating the color of a surface according to the invention.
Figure 4:
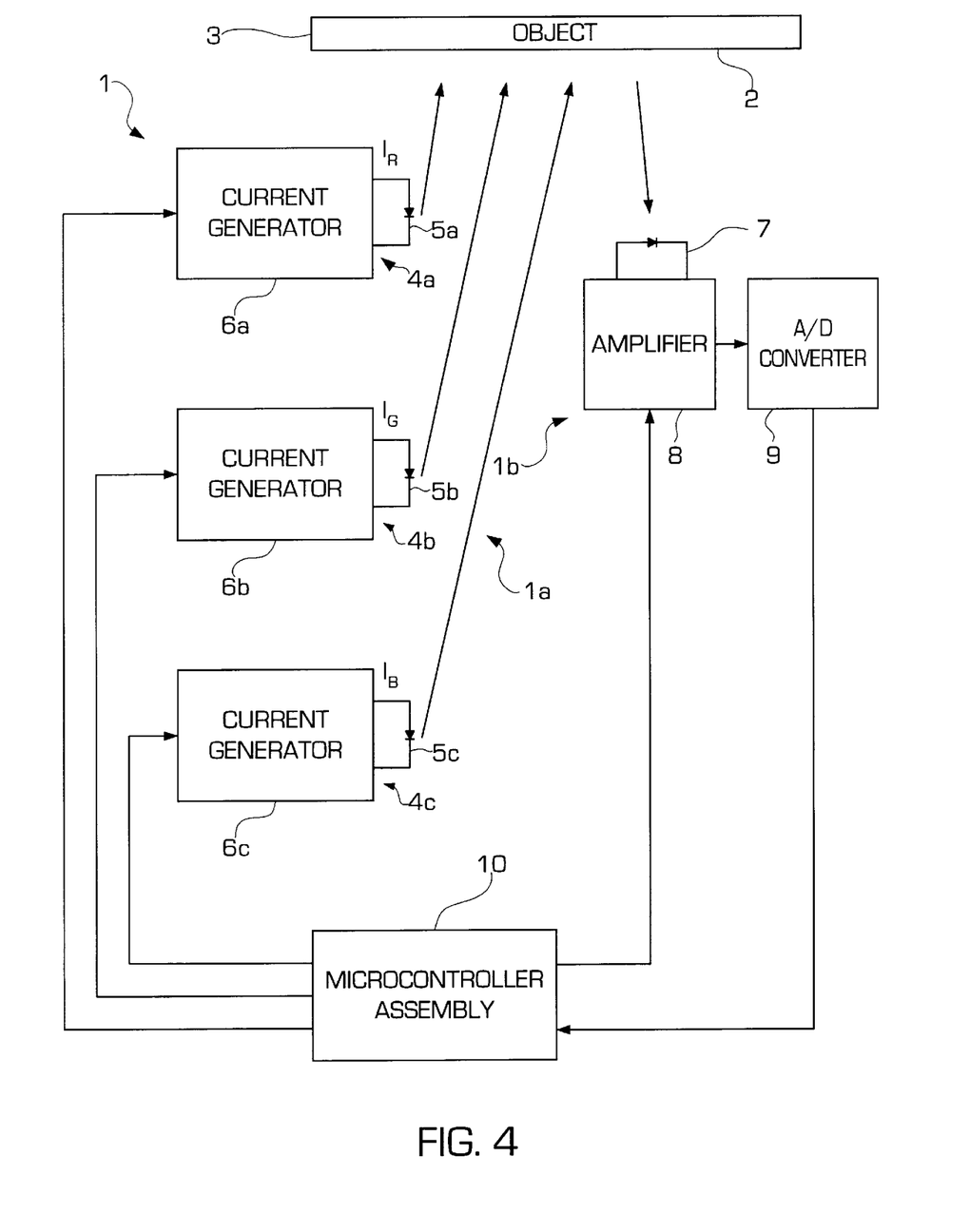
FIG. 4 is a block diagram illustrating a second embodiment of an apparatus for discriminating the color of a surface according to the invention.

Shown at 1 in FIGS. 1 and 4 is an apparatus for discriminating the color of a detecting surface 2 of an object 3. The apparatus 1 comprises an emission assembly 1a for emitting three light beams corresponding to three primary colors, i.e. red, green and blue, and a pick-up assembly 1b for picking up light scattered from the surface 2 when illuminated with said light beams.

The emission assembly 1a includes three emission sources 4a, 4b, 4c for the above three light beams. In the embodiment shown in the above figures, the three emission sources 4a, 4b, 4c are in particular three separate LEDs, respectively of red, green and blue color, which are supplied with respective supply currents $I_R$, $I_G$, $I_B$ through respective power supply circuits 5a, 5b, 5c, each connected to a respective current generator 6a, 6b, 6c.

Alternatively, the emission sources 4a, 4b, 4c could be three laser diodes of red, green and blue color.

The pick-up assembly 1b includes a light-receiving element 7, such as a photodiode, operative to pick up scattered light from the illuminated surface 2 and generate an electric signal $V_R$, $V_G$, $V_B$ which is proportional to the luminous intensity of the picked-up light. The light-receiving element 7 is operatively connected in series to an amplifier 8 of the electric signals $V_R$, $V_G$, $V_B$ which is itself connected to an analog-to-digital converter 9 for the amplified signal.

A microcontroller assembly 10 is operatively interposed between the pick-up assembly 1b and the emission assembly 1a for controlling the supply currents $I_R$, $I_G$, $I_B$ of the three emission sources 4a, 4b, 4c according to the electric signals $V_R$, $V_G$, $V_B$ coming from the pick-up assembly 1b. In particular, the microcontroller assembly 10 is connected, with an input section thereof, to the analog-to-digital converter 9 and, with an output section, to the three current generators 6a, 6b, 6c.

In the embodiment shown in FIG. 4, the microcontroller assembly 10 is connected in series, with another output section thereof, to the amplifier 8 of the pick-up assembly 1b for the scattered light from the surface 2. The amplifier 8 is here a variable type of amplifier, that is one capable of varying, on command from the microprocessor 10, the amplification level of the electric signal generated by the light receiver 7.

In a first alternative embodiment of the apparatus according to the invention (not shown), the amplifier 8 is substituted with three different amplification channels, one for each of the electric signals $V_R$, $V_G$, $V_B$.

In a second alternative embodiment of the apparatus according to the invention (not shown), the apparatus 1 has no analog-to-digital converter 9 and includes a circuit for measuring the electric signals $V_R$, $V_G$, $V_B$ and controlling the supply currents $I_R$, $I_G$, $I_B$ which operates by processing analog signals.

In operation, the apparatus 1 is set, during a first acquisition step, for storing parameters representing a color to be subsequently recognized. During a subsequent recognition step, the parameters representing the color of the surface 2 of the object 3 being scanned are compared with those acquired during the previous step, thereby to discriminate the color of the surface 2.

In particular, during the first acquisition step, the apparatus 1 is placed in front of an acquisition surface bearing the color to be acquired. This surface is illuminated sequentially with each of the three light beams from the emission sources 4a, 4b, 4c; scattered light is picked up by the light-receiving element 7 to generate, accordingly, an analog electric signal $V_R$, $V_G$, $V_B$ which is proportional to the luminous intensity of the picked-up light. This electric signal is then amplified, converted to a digital signal, and delivered to the microcontroller assembly 10. In particular, the microcontroller assembly 10 controls the supply current $I_R$, $I_G$, $I_B$ of the emission sources 4a, 4b, 4c such that the three signals $V_R$, $V_G$, $V_B$ received are all equal, within a predetermined tolerance margin, to a predetermined reference value. Alternatively, where this control is impracticable, the microcontroller assembly 10 could control the supply current $I_R$, $I_G$, $I_B$ of the emission sources 4a, 4b, 4c such that the three signals $V_R$, $V_G$, $V_B$ received are all equal, within a predetermined tolerance margin, to the smallest among them. Alternatively, where both of the above controls are impracticable, the microcontroller assembly 10 could control the supply current $I_R$, $I_G$, $I_B$ of the emission sources 4a, 4b, 4c such that only two of the signals $V_R$, $V_G$, $V_B$ having the highest values are identical, within a predetermined tolerance margin. In either case and regardless of the type of control applied, the microcontroller assembly 10 will store the values of the signals $V_R$, $V_G$, $V_B$ received after said control and the values of the respective supply currents $I_R$, $I_G$, $I_B$, and calculate the following reference parameters:

$$R = \frac{V_R}{V_R + V_G + V_B} \quad G = \frac{V_G}{V_R + V_G + V_B} \quad B = \frac{V_B}{V_R + V_G + V_B}$$

The above parameters are stored up.

During the subsequent recognition step, the apparatus 1 is placed in front of a detecting surface 2 bearing the color to be discriminated. The apparatus sequentially illuminates said surface 2 with the three light beams from the emission sources 4a, 4b, 4c, and similarly as in the acquisition step, electric signals $V_R'$, $V_G'$, $V_B'$ are generated which are proportional to the luminous intensity of the light scattered from the surface 2 and picked up in the light-receiving element 7. Here again, reference variables R', G', B' are calculated and compared with the parameters R, G, B previously calculated during the acquisition step to check if they match within a predetermined tolerance margin, and ultimately recognize the color of the surface 2.

The process of this invention for discriminating the color of the surface 2 will now be explained in detail.

Figure 2:
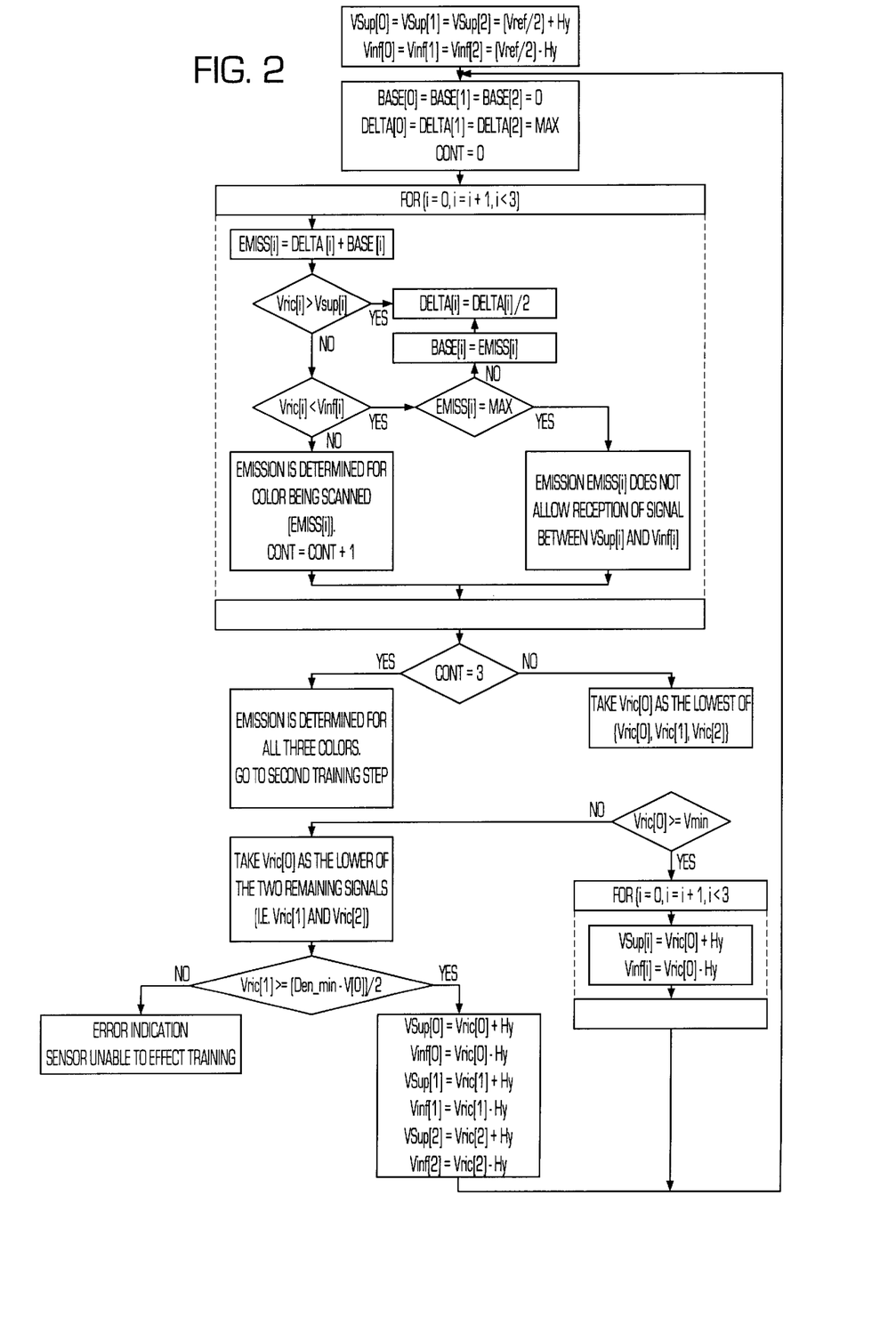
FIG. 2 is a flow diagram relating to a first step of a discriminating process implemented by the apparatus of FIG. 1.

Referring to FIG. 2, the acquisition procedure provides for the initial setting of a range of values for the supply current $I_R$, $I_G$, $I_B$ of the emission sources 4a, 4b, 4c to lie between a minimum (BASE) value initially set at zero and a maximum (DELTA) value initially set at a maximum value (MAX); the apparatus 1 is then controlled to supply one of the current generators 6a, 6b, 6c with a actual value (EMISS) of the supply current $I_R$, $I_G$, $I_B$ equal to the maximum value (MAX). A check is then made to see if the corresponding signal, e.g. $V_R$, has a value within a predetermined range defined by a reference value, being for example one half the reference voltage $V_{ref}$ used by the converter 9 plus or minus a predetermined tolerance margin $H_y$ which may be selected, for example, according to the signal noise. In particular, during a first step, it is checked that $V_R$ is lower than the upper value ($V_{sup}=V_{ref}/2+H_y$) of said range, and if so, it is checked that $V_R$ is higher than above the lower value ($V_{inf}=V_{ref}/2-H_y$) in the same range.

If both checks give a positive result, the values of said signal $V_R$ and respective supply current $I_R$ are stored, and the above checks are repeated iteratively for the following signals $V_G$ and $V_B$. Conversely, if it is $V_R>V_{sup}$, the actual value of the supply current $I_R$ is halved, and the above checks are repeated iteratively until $V_R$ falls within the predetermined range of values. If it is $V_R<V_{inf}$, a step is carried out to check if the actual value (EMISS) of the supply current $I_R$, $I_G$, $I_B$ equals the value (MAX) set at the start. If such check gives a negative result, the value of the supply current $I_R$ is updated by setting, as the actual value (EMISS), the previously defined value (BASE), and as the value (DELTA), a value equal to one half the previously set value (DELTA), and the comparison is repeated for $V_R$ until $V_R$ falls within the predetermined range of values. On the contrary, if (EMISS)=(MAX), since it would be no longer possible to raise the actual value (EMISS) of the supply current, the values of the signals $V_G$ and $V_B$ and respective supply currents $I_G$ and $I_B$ are acquired, by repeating the steps previously described for $V_R$, and as the reference value $V_{ric(0)}$, the value of the smallest of the digital signals $V_R$, $V_G$, $V_B$ is set.

It is then checked if $V_{ric(0)}$ is equal to or higher than a first predetermined minimum value (Vmin), for example equal to one third the value of the smallest acceptable sum (Den_min) of the values of the signals $V_R$, $V_G$, $V_B$; if such check gives a positive result, the acquisition steps previously described are repeated starting with $V_R$ for the three signals $V_R$, $V_G$, $V_B$, each time checking that the values of all the signals $V_R$, $V_G$, $V_B$ obtained are within a range of values defined as $V_{ric(0)}$ plus or minus the aforementioned tolerance margin $H_y$. If, on the contrary, $V_{ric(0)}$ is found to be lower than Vmin, a decision is made to abandon the attempt to equalize all three of the signals from the three emissions, in particular accepting that one of them is different, and an equalization of the two others is attempted if they are higher than a predetermined minimum.

In particular, the value of the smallest signal between the remaining two signals $V_R$, $V_G$, $V_B$ is set as the reference value $V_{ric(1)}$, and it is checked if the reference value thus set is equal to or higher than a second minimum value equal, for example, to one half the difference between the value (Den_min) of the smallest acceptable sum of the values of the signals $V_R$, $V_G$, $V_B$ and the value of the signal $V_{ric(0)}$. If such check gives a positive result, $V_{ric(0)}$ is set as the reference value for the smallest signal of the digital signals $V_R$, $V_G$, $V_B$, and $V_{ric(1)}$ is set as the reference value of the two remaining signals; thus, new reference ranges are established, similarly as above, at $V_{ric(0)}$ and $V_{ric(1)}$, respectively for the smallest of the digital signals $V_R$, $V_G$, $V_B$ and for the two remaining signals, and the aforementioned acquisition steps $V_R$, $V_G$, $V_B$ are repeated, checking that each of them lies within its respective reference range. If, on the contrary, $V_{ric(1)}$ is found smaller than said second minimum value, the acquisition procedure is terminated with an error indication.

Figure 5:
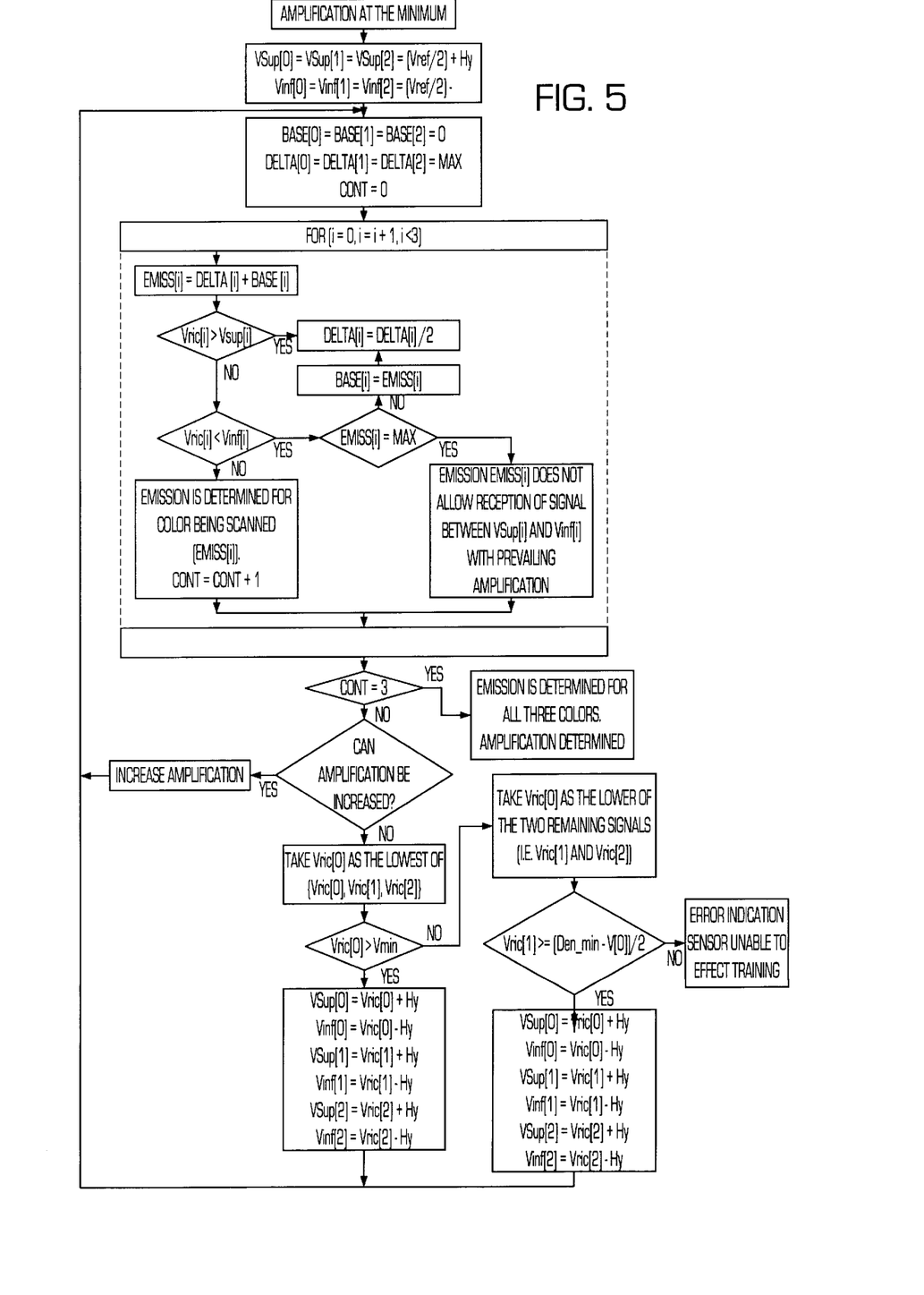
FIG. 5 is a flow diagram relating to a first step of a discriminating process implemented by the apparatus of FIG. 4.

According to the embodiment shown in FIG. 5, where the apparatus 1 is equipped with a variable type of amplifier, the acquisition procedure begins with the setting of a minimum amplification level, to be raised iteratively by one prefixed interval in the event that no signal $V_R$, $V_G$, $V_B$ can be received which lies within the reference range defined at the reference value $V_{ref}$, so as to avoid possible saturation or excessively low levels of the components $V_R$, $V_G$, $V_B$.

The first step of the acquisition procedure described above may alternatively, be carried out simultaneously for the three emissions; in any case, this procedure would be terminated by an error indication, or preferably, by determining and storing the three supply current values of the LEDs by which each signal $V_R$, $V_G$, $V_B$ received lies within the predetermined range of reference values.

With the emission levels thus determined, a plurality of measurements of $V_R$, $V_G$, $V_B$ are then made. Owing to noise, the measured values of $V_R$, $V_G$, $V_B$ would not always be the same, but they vary. An arithmetical mean of the values received at each emission can then be calculated, whereby minimum and maximum limits of such values can be calculated by respectively adding to and subtracting from said arithmetical mean a predetermined error selected to suit specific application requirements(e.g., taking account of the error from conversion, noise, etc.).

At this point, the reference parameters R, G, B are calculated, and upper and lower limits are calculated for each of them using the following formulae:

R_sup=VRmax/(VRmax+VGmin+VBmin)
R_inf=VRmin/(VRmin+VGmax+VBmax)
G_sup=VGmax/(VRmin+VGmax+VBmin)
G_inf=VGmin/(VRmax+VGmin+VBmax)
B_sup=VBmax/(VRmin+VGmin+VBmax)
B_inf=VBmin/(VRmax+VGmax+VBmin).

The above reference parameters are stored up.

In this way, during the following "recognition" step, no wrong recognition will be made because of the error affecting each conversion (error on the analog signal and converter error). Furthermore, an addition tolerance margin may be introduced (for instance, to avoid errors from variations in the received signal due to temperature, etc.) by multiplying the values Vmax, VGmax and VBmax by a factor (1+Toll), where Toll=2.5%, for example, and the values VRmin, VGmin and VBmin by a factor (1−Toll), before determining the upper and lower limits of VR, VG, VB. Also, to avoid having the parameters R, G, B affected by a too large error (which would harm the color discrimination accuracy), the sum of the three signals VR, VG, VB is imposed higher than a certain value given by the ratio of the error affecting the received signal (converter error and noise) to the largest error that can be accepted in conformity with the color discrimination accuracy sought.

Where a plurality of colors, rather than a single color, are to be discriminated, the procedure described hereinabove would be repeated sequentially for all the colors to be subsequently recognized, each time storing the respective triplets of supply currents IR, IG, IB determined.

Lastly, where a color range, i.e. a plurality of different hues of a predetermined color, are to be acquired, the acquisition procedure comprises two discrete training steps. During a first step, the same procedure for color acquisition as described above is followed, whereby one of the two extremes of the color range to be recognized is determined. The values VRmax1, VGmax1, VBmax1 and VRmin1, VGmin1, VBmin1 relating to this first step are then defined, and on their basis, the following reference parameters are calculated:

R_sup1=VRmax1/(VRmax1+VGmin1+VBmin1)
R_inf1=VRmin1/(VRmin1+VGmax1+VBmax1)
G_sup1=VGmax1/(VRmin1+VGmax1+VBmin1)
G_inf1=VGmin1/(VRmax1+VGmin1+VBmax1)
B_sup1=VBmax1/(VRmin1+VGmin1+VBmax1)
B_inf1=VBmin1/(VRmax1+VGmax1+VBmin1).

At this point, without changing the supply current values determined during the first training step, a second acquisition is carried out for the other extreme of the color range to be recognized. Thus, the values VRmax2, VGmax2, VBmax2 and VRmin2, VGmin2, VBmin2 relating to this second step are defined, and it is checked that the maximum values do not lie next to the converter end-of-scale (for example, lower than NFS-3, where NFS is the highest value that the converter can provide, namely 255 for an 8-bit converter, 511 for a 9-bit converter, etc.), and that the sum of the signals is higher than the lowest acceptable value. If these checks give a positive result, the following reference parameters are calculated:

R_sup2=VRmax/(VRmax+VGmin+VBmin)
R_inf2=VRmin/(VRmin+VGmax+VBmax)
G_sup2=VGmax/(VRmin+VGmax+VBmin)
G_inf2=VGmin/(VRmax+VGmin+VBmax)
B_sup2=VBmax/(VRmin+VGmin+VBmax)
B_inf2=VBmin/(VRmax+VGmax 30 VBmin).

Thereafter, as the upper and lower limits of the parameters representing the color range to be recognized, the maximum and minimum values of the parameters just calculated are respectively selected, namely:

R_sup=maximum {R_sup1, R_sup2}
R_inf=minimum {R_inf1, R_inf2}
G_sup=maximum {G_sup1, G_sup2}
G_inf=minimum {G_inf1, G_inf2}
B_sup=maximum {B_sup1, B_sup2}
B_inf=minimum {B_inf1, B_inf2}.

Figure 3:
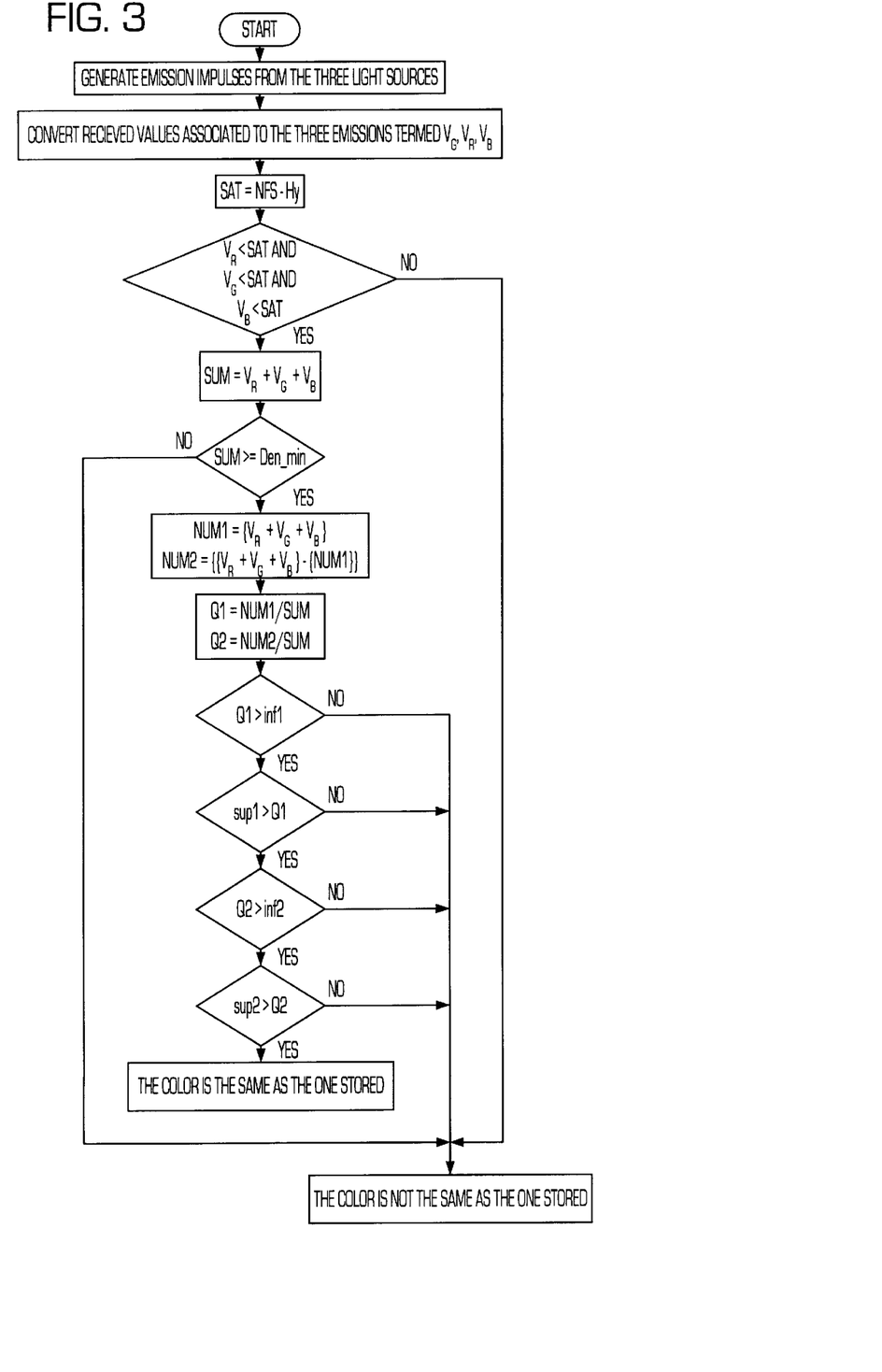
FIG. 3 is a flow diagram relating to a second step of the discriminating process implemented by the apparatus of FIG. 1.

On completion of the acquisition step, the apparatus 1 of this invention will be able to recognize the color (and/or colors, or color range) acquired. In particular, according to the recognition procedure shown in FIG. 3, variables representing the color to be recognized are determined, similar as in the acquisition procedure. These variables are calculated on the basis of the signals VR', VG', VB' received at the light-receiving element 7 when the surface 2 bearing the color to be recognized is illuminated. Each one of the signals VR', VG', VB' is compared with a saturation value equal, for example, to NFS-Hy, in order to check that they are lower said saturation value, and that their sum is higher than a predetermined minimum value equal, for example, to the value Den_min. If both checks give a positive result, the two signals NUM1 and NUM2 having the highest values are selected among the signals VR', VG', VB', and for each selected signal, a reference variable Q1 and Q2 is defined which equals the ratio of the selected signal to the sum of the signals VR', VG', VB'. It is then checked that each of the reference variables Q1, Q2 is contained within a range of values defined by the upper (sup1, sup2) and lower (inf1, inf2) limits calculated during the previous acquisition step. Specifically, the values inf1, sup1, inf2 and sup2 are:

if NUM1 is VR', then sup1=R_sup and inf1=R_inf
if NUM1 is VG', then sup1=G_sup and inf1=G_inf
if NUM1 is VB', then sup1=B_sup and inf1=B_inf
if NUM2 is VR', then sup2=R_sup and inf2=R_inf
if NUM2 is VG', then sup2=G_sup and inf2=G_inf
if NUM2 is VB', then sup2=B_sup and inf1=B_inf.

If all of the above checks give a positive result, the procedure is terminated with an indication of color recognition. If, on the contrary, at least one of the above checks gives a negative result, the procedure is terminated with an indication of color non-recognition.

Figure 6:
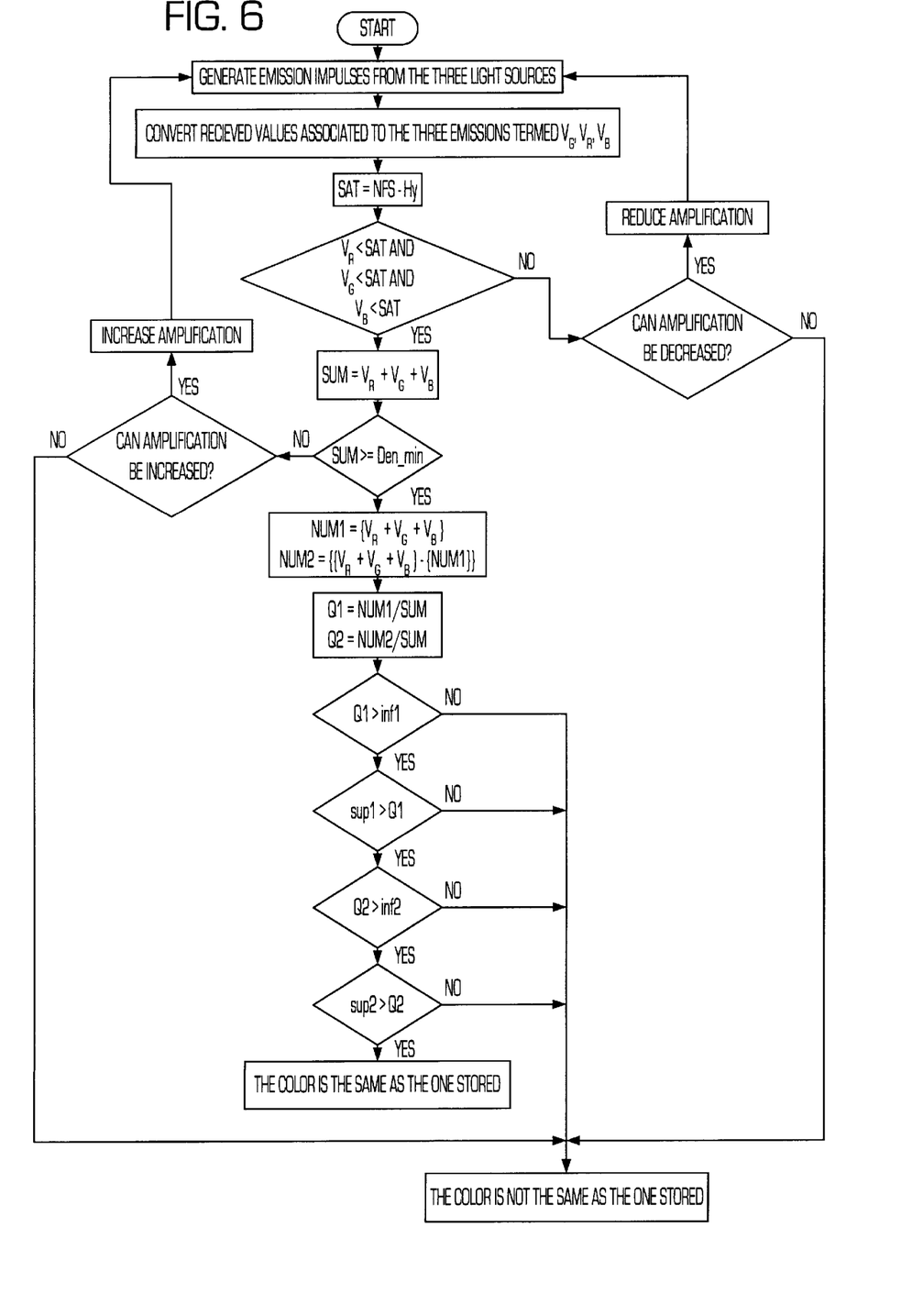
FIG. 6 is a flow diagram relating to a second step of the discriminating process implemented by the apparatus of FIG. 4.

According to the embodiment shown in FIG. 6, where the apparatus 1 is equipped with a variable type of amplifier, the recognition procedure would include the steps of lowering the amplification level of the signals VR', VG', VB' if one of said signals is higher than said saturation value NFS-Hy, or raising it if the sum of the signals VR', VG', VB' is lower than the predetermined minimum value Den_min, thereby to prevent possible saturation or excessively low levels of the components VR', VG', VB'. This is possible because a variation in the amplifier gain would change the values of VR', VG', VB', but does not influence the calculation of said color-representing variables.

In an alternative embodiment of the inventive process, all of the above steps can be advantageously carried out by respectively utilizing the parameters R. G, B instead of the signals VR, VG, VB in the acquisition procedure and the variables R', G', B' instead of the signals VR', VG', VB' in the recognition procedure. In this way, the color-discriminating operation can be made independent of the reading distance (distance of the apparatus from the detecting surface), which distance would affect the values of the individual signals VR, VG, VB and VR', VG', VB', but not the result of the ratio R, G, B and R', G', B'.

The process of this invention, as above described, affords a number of advantages, among which are those listed here below.

First of all, it provides an accurate discrimination of any color (and/or any color hue and/or plurality of different colors) on a surface, regardless of whether it corresponds to a primary color.

Also, the process of this invention is unconditioned by either aging phenomena of the optical components mounted on the discriminating apparatus or spread phenomena of the basic operational parameters of such components.

Further, the process of this invention allows a substantial increase in the working field depth of the apparatus implementing the process and a considerable increase in color-discriminating capability, even where the signals generated by the light-receiving element are very weak (for instance, because originating from dark colors on a far surface) and/or very strong (for instance, because originating from light colors on a near surface).

What is claimed is:

1. A process for discriminating the color of a surface, comprising the steps of:
    a) acquiring at least one color of a colored acquisition surface;
    b) comparing the color of a detecting surface with said at least one color previously acquired, so that said color can be recognized; wherein the acquisition step a) comprises the following steps:
        a1) sequentially illuminating the acquisition surface with each of three light beams corresponding to three primary colors, each of said light beams being generated by a respective emission source supplied with a supply current IR, IG, IB;
        a2) picking up by means of a light-receiving element the light scattered from the illuminated acquisition surface;
        a3) generating an electric signal VR, VG, VB proportional to the luminous intensity of the picked-up light, as the acquisition surface is being illuminated with each of the three beams;
        a4) controlling the supply current IR, IG, IB of the emission sources such that at least two of the electric signals VR, VG, VB generated are identical with each other within a predetermined tolerance margin; and wherein the recognition step b) includes the following steps:
        b1) sequentially illuminating, with the aforesaid three light beams, the detecting surface bearing the color to be recognized;
        b2) picking up, by means of the light-receiving element, the light scattered from said illuminated surface;
        b3) generating an electric signal VR', VG', VB' proportional to the luminous intensity of the picked-up light, as the detecting surface is being illuminated with each of the three beams;
        b41) checking that the electric signals VR', VG', VB' generated are lower than a predetermined saturation value and that their sum is higher a predetermined minimum value and:
        b41a) if both of said checks give a positive result, checking that at least two of the values of the electric signals VR', VG', VB' generated are equal, within a predetermined tolerance margin, to those of the electric signals VR, VG, VB acquired during step a);
        b41b) if at least one of said checks gives a negative result, indicating that the color of the surface being scanned is not recognized.

2. A process according to claim 1, wherein step b41a) further includes the following steps:
    selecting, from the signals VR', VG', VB', the two signals having the highest values;
    defining, for each of the selected signals, a reference variable R', G', B' equal to the ratio of the selected signal to the sum of the signals VR', VG', VB';
    checking if each of the reference variables above defined falls within a respective predetermined range of values and:
        if the above check gives a positive result for both said variables, indicating that the color is recognized;
        if the above check gives a negative result for at least one of said variables, indicating that the color of the surface being scanned is not recognized.

3. A process for discriminating a color range of a surface, characterized in that it comprises the following steps:
    i) performing, according to claim 1, a first acquisition of a first color establishing one extreme of a color range to be recognized;
    ii) storing the supply current values determined during step i);
    iii) performing, according to claim 1 and using said emission current values, a second acquisition of a second color establishing the other extreme of said color range;
    iv) checking that the values of the electric signals VR', VG', VB' generated during the recognition step, according to claim 1, are the same, within a predetermined tolerance margin, as those of the electric signals VR, VG, VB acquired during said acquisition steps.

4. A process for discriminating a plurality of colors on a surface, characterized in that it comprises the following steps:
    performing sequentially, according to claim 1, a plurality of acquisitions of a plurality of colors;
    each time storing the supply current values determined during the preceding step;
    checking that the values of the electric signals VR', VG', VB' generated during the recognition steps according to claim 1, are the same, within a predetermined tolerance margin, as those of the electric signals VR, VG, VB acquired during said acquisition steps.

5. A process according to claim 3, wherein the supply current IR, IG, IB of the emission sources is controlled such that only two of the electric signals VR, VG, VB generated are identical with each other, within a predetermined tolerance margin, and higher than a predetermined minimum value.

6. A process for discriminating the color of a colored surface, comprising the following steps:
   a1) sequentially illuminating an acquisition surface having the color to be discriminated with each of three light beams corresponding to three primary colors, each of said light beams being generated by a respective emission source supplied with a supply current IR, IG, IB;
   a2) picking up by means of a light-receiving element the light scattered from the illuminated acquisition surface;
   a3) generating an electric signal VR, VG, VB proportional to the luminous intensity of the picked-up light, as the acquisition surface is being illuminated with each of the three beams;
   a4) controlling the supply current IR, IG, IB of the emission sources such that at least two of the electric signals VR, VG, VB generated are identical with each other, within a predetermined tolerance margin;
   a5) acquiring the color of the acquisition surface by memorizing the supply current values IR, IG, IB thus controlled;
   b) comparing the color of a detecting surface having the color to be discriminated with said color previously acquired, so that said color of the detecting surface can be recognized.

7. A process according to claim 6, wherein the supply current IR, IG, IB of the emission sources is controlled such that the electric signals VR, VG, VB generated are all identical with one another, within a predetermined tolerance margin.

8. A process according to claim 7, wherein the supply current IR, IG, IB of the emission sources is controlled such that the electric signals VR, VG, VB generated are all equal, within a predetermined tolerance margin, to a predetermined reference value.

9. A process according to claim 5, wherein the supply current IR, IG, IB of the emission sources is controlled such that the electric signals VR, VG, VB generated are all equal, within a predetermined tolerance margin, to the value of the smallest of said signals.

10. A process according to claim 5, wherein step a3) further includes the following steps:
   a31) generating, within a light-receiving element, an analog electric signal which is proportional to the intensity of the picked-up light;
   a32) amplifying the analog electric signal generated by the light-receiving element;
   a33) converting the amplified analog signal to a digital signal VR, VG, VB.

11. A process according to claims 10, wherein the supply current IR, IG, IB of the emission sources is controlled such that the electric signals VR, VG, VB generated are all equal, within a predetermined tolerance margin, to a predetermined reference value and wherein step a4) further includes the following steps:
   a41) checking if each of the digital signals VR, VG, VB has its value within a predetermined range of values defined by said reference value plus/minus a predetermined tolerance margin and:
      a41a) if so, storing the values of said digital signals VR, VG, VB
      a41b) if not so, iteratively varying the supply current within a predetermined range of current values, and repeating step a41) at each iteration.

12. A process according to claim 11, wherein step a41) further includes the following steps:
   a411) setting the value of the supply current IR, IG, IB of the emission source which is supplied, first at a actual value equal to the highest value in a predetermined range of supply current values;
   a412) checking if the value of the first of the signals VR, VG, VB to be generated is lower than an upper limiting value of said predetermined range of values and:
      a412a) if so, checking that the value of said signal VR, VG, VB is higher than a lower limiting value of said predetermined range of values, and if so, storing the actual value of the supply current IR, IG, IB and iteratively repeating the steps from a411) for the emission source coming next in the supply sequence;
      a412b) if not so, reducing the value of said supply current IR, IG, IB by a predetermined factor, and iteratively repeating step a412).

13. A process according to claim 12, wherein, if the check of step a412a) gives a negative result, a step is carried out to check if the actual value of the supply current IR, IG, IB is different from the highest value in the predetermined range of current values and:
   if so, taking as the supply current value a value equal to one half the difference between the highest value in the predetermined range of current values and the actual value of the supply current IR, IG, IB and repeating the steps from a412);
   if not so, carrying out the following steps:
      a412a1) iteratively repeating the steps from a411) for the emission source coming next in the supply sequence;
      a412a2) setting, as the reference value, the value of the smallest of the digital signals VR, VG, VB and repeating the steps from a41).

14. A process according to claim 13, wherein step a412a2) is preceded by a step of checking if the amplification of the analog electric signal can be increased and, if so, increasing by a predetermined interval the amplification of the analog electric signal and iteratively repeating the steps from a411);
   if not so, carrying out step a412a2).

15. A process according to claim 13, wherein step a412a2) further includes the following steps:
   checking if the reference setting value is higher than a first predetermined minimum value and:
      if so, repeating the steps from a41);
      if not so, setting the smaller of the remaining two of the signals VR, VG, VB as the reference value, and repeating the steps from a41).

16. A process according to claim 5, wherein if the check of step a412a2) gives a negative result, the following steps are carried out:
   checking if the reference setting value is higher than a second minimum value, and
   if so, setting as the reference value for the smallest of the digital signals VR, VG, VB, the actual value of that signal, and as the reference value for the remaining two signals the value of the smaller of the two actual remaining signals, and repeating the steps from a41);
   if not so, indicating an error.

17. A process according to claim 10, wherein the supply current IR, IG, IB of the emission sources is controlled such that the electric signals VR, VG, VB generated are all equal, within a predetermined tolerance margin, to a predetermined reference value and wherein the reference value is defined as one half the reference voltage utilized by an analog-to-digital converter employed.

18. A process according to claim 15, wherein the first predetermined minimum value is one third the value of the smallest acceptable sum of the signals VR, VG, VB values.

19. A process according to claim 16, wherein the second predetermined minimum value is one half the difference between the value of the smallest acceptable sum of the signal VR, VG, VB values and the value of the smallest of the signals VR, VG, VB.

20. A process according to claim 12, further comprising the following steps:

making a plurality of measurements of VR, VG, VB using the stored supply current values IR, IG, IB;

calculating the arithmetical mean of the values of the signals VR, VG, VB corresponding to each stored supply current IR, IG, IB;

calculating the minimum and maximum limiting values of the digital signals VR, VG, VB by respectively adding and subtracting to/from said arithmetical mean a predetermined error, selected to suit specific application requirements.

21. A process according to claim 20, further comprising the following steps:

defining reference parameters R, G, B respectively as the ratio of the value of each signal VR, VG, VB to their sum;

calculating, for each reference parameter, an upper limit respectively defined as the ratio of the maximum value of the signal VR, VG, VB considered to the sum of that maximum value plus the minimum values of the other two signals VR, VG, VB.

22. A process according to claim 20, further comprising the following steps:

defining reference parameters R, G, B respectively as the ratio of the value of each signal VR, VG, VB to their sum;

calculating, for each reference parameter, a lower limit respectively defined as the ratio of the minimum value of the signal VR, VG, VB considered to the sum of that minimum value plus the maximum values of the other two signals VR, VG, VB.

23. A process according to claim 6, wherein the recognition step b) includes the following steps:

b1) sequentially illuminating, with the aforesaid three light beams, the detecting surface bearing the color to be recognized;

b2) picking up, by means of the light-receiving element, the light scattered from said illuminated surface;

b3) generating an electric signal VR', VG', VB' proportional to the luminous intensity of the picked-up light, as the detecting surface is being illuminated with each of the three beams;

b4) checking that at least two of the values of the electric signals VR', VG', VB' generated are equal, within a predetermined tolerance margin, to those of the electric signals VR, VG, VB acquired during step al1 to a5).

24. A process according to claim 23, wherein step b4) includes the following steps:

b41) checking that the electric signals VR', VG', VB' generated are lower than a predetermined saturation value and that their sum is higher a predetermined minimum value and:

b41a) if both of said checks give a positive result, carrying out step b4);

b41b) if at least one of said checks gives a negative result, indicating that the color of the surface being scanned is not recognized.

25. A process according to claim 24, wherein the electric signal are amplified to an amplification level and if the first of the checks of step b41) gives a negative result, a step is carried out to check if the amplification level can be lowered and:

if so, lowering said amplification level by a predetermined interval and iteratively repeating the steps from b41);

it not so, indicating that the color of the surface being scanned is not recognized.

26. A process according to claim 24, wherein the electric signal are amplified to an amplification level and if the second of the checks of step b41) gives a negative result, a step is carried out to check if the amplification level can be raised and:

if so, raising said amplification level by a predetermined interval and iteratively repeating the steps from b41);

it not so, indicating that the color of the surface being scanned is not recognized.

27. A process according to claim 24, wherein step b41a) further includes the following steps:

selecting, from the signals VR', VG', VB', the two signals having the highest values;

defining, for each of the selected signals, a reference variable R', G', B' equal to the ratio of the selected signal to the sum of the signals VR', VG', VB';

checking if each of the reference variables above defined falls within a respective predetermined range of values and:

if the above check gives a positive result for both said variables, indicating that the color is recognized;

if the above check gives a negative result for at least one of said variables, indicating that the color of the surface being scanned is not recognized.

28. A process for discriminating a color range of a surface, characterized in that it comprises the following steps:

i) performing, according to claim 6, a first acquisition of a first color establishing one extreme of a color range to be recognized;

ii) storing the supply current values determined during step i);

iii) performing, according to claim 6 and using said emission current values, a second acquisition of a second color establishing the other extreme of said color range;

iv) checking that the values of the electric signals VR', VG', VB' generated during the recognition step, are the same, within a predetermined tolerance margin, as those of the electric signals VR, VG, VB acquired during said acquisition steps a1) to a5).

29. A process for discriminating a plurality of colors on a surface, characterized in that it comprises the following steps:

performing sequentially, according to claim 6, a plurality of acquisitions of a plurality of colors;

each time storing the supply current values determined during the preceding step;

checking that the values of the electric signals VR', VG', VB' generated during the recognition steps are the same, within a predetermined tolerance margin, as those of the electric signals VR, VG, VB acquired during said acquisition steps a1) to a5).

30. An apparatus for discriminating the color of a colored surface, comprising:

three emission sources of three light beams corresponding to three primary colors being respectively supplied with a supply current IR, IG, IB;

a light-receiving element adapted to receive light scattered from the illuminated surface and generate an electric signal VR, VG, VB which is proportional to the luminous intensity of the picked-up light;

a microcontroller assembly for controlling the supply current IR, IG, IB of the emission sources such that when an acquisition surface having the color to be discriminated is illuminated at least two of the electric signals VR, VG, VB generated are identical with each other, within a predetermined tolerance margin.

31. An apparatus according to claim 30, wherein the emission sources (4a, 4b, 4c) are either LEDs or laser diodes.

32. An apparatus according to claim 30, further comprising an amplifier (8) for amplifying the analog signals generated by the light-receiving element, and an analog-to-digital converter (9) for converting said amplified signals.

33. An apparatus according to claim 32, wherein said amplifier (8) comprises three separate amplification channels, each for amplifying one of the signals VR, VG, VB.

34. An apparatus according to claim 32, wherein the amplifier (8) is operatively associated with the microcontroller assembly (10) so that the amplification level of the signals VR, VG, VB can be varied to suit specific application requirements.

35. A process for discriminating the color of a colored surface, comprising the following steps:

a1) sequentially illuminating an acquisition surface having the color to be discriminated with each of three light beams corresponding to three primary colors, each of said light beams being generated by a respective emission source supplied with a supply current IR, IG, IB;

a2) picking up by means of a light-receiving element the light scattered from the illuminated acquisition surface;

a3) generating an electric signal proportional to the luminous intensity of the picked-up light, as the acquisition surface is being illuminated with each of the three beams and converting said electric signal into a digital signal VR, VG, VB;

a41) checking if each of the digital signals VR, VG, VB has its values within a predetermined range of values defined by a reference value plus/minus a predetermined tolerance margin, and:

a41a) if so, acquiring the color of the acquisition surface by memorizing the supply current values IR, IG, IB thus controlled and b) comparing the color of a detecting surface having the color to be discriminated with said color previously acquired, so that said color of the detecting surface can be recognized;

a41b) if not so, iteratively varying the supply current within a predetermined range of current values, and repeating step a41) at each iteration.

36. A process according to claim 35, wherein step a41) further includes the following steps:

a411) setting the value of the supply current IR, IG, IB of the emission source whiqh is supplied first at a actual value equal to the highest value in a predetermined range of supply current values;

a412) checking if the value of the first of the signals VR, VG, VB to be generated is lower than an upper limiting value of said predetermined range of values and:

a412a) if so, checking that the value of said signal VR, VG, VB is higher than a lower limiting value of said predetermined range of values, and if so, storing the actual value of the supply current IR, IG, IB and iteratively repeating the steps from a411) for the emission source coming next in the supply sequence;

a412b) if not so, reducing the value of said supply current IR, IG, IB by a predetermined factor, and iteratively repeating step a412).

37. A process according to claim 36, wherein, if the check of step a412a) gives a negative result, a step is carried out to check if the actual value of the supply current IR, IG, IB is different from the highest value in the predetermined range of current values and:

if so, taking as the supply current value a value equal to one half the difference between the highest value in the predetermined range of current values and the actual value of the supply current IR, IG, IB and repeating the steps from a412);

if not so, carrying out the following steps:

a412a1) iteratively repeating the steps from a411) for the emission source coming next in the supply sequence;

a412a2) setting, as the reference value, the value of the smallest of the digital signals VR, VG, VB and repeating the steps from a41).

38. A process according to claim 37, wherein step a412a2) is preceded by a step of checking if the amplification of the analog electric signal can be increased and:

if so, increasing by a predetermined interval the amplification of the analog electric signal and iteratively repeating the steps from a411);

if not so, carrying out step a412a2).

39. A process according to claim 37, wherein step a412a2) further includes the following steps:

checking if the reference setting value is higher than a first predetermined minimum value and:

if so, repeating the steps from a41);

if not so, setting the smaller of the remaining two of the signals VR, VG, VB as the reference value, and repeating the steps from a41).

40. A process according to claim 39, wherein if the check of step a412a2) gives a negative result, the following steps are carried out:

checking if the reference setting value higher than a second minimum value, and if so, setting as the reference value for the smallest of the digital signals VR, VG, VB , the actual value of that signal, and as the reference value for the remaining two signals the value of the smaller of the two actual remaining signals, and repeating the steps from a41);

if not so, indicating an error.

41. A process according to claims 35, wherein the supply current IR, IG, IB of the emission sources is controlled such that the digital signals VR, VG, VB generated are all equal, within a predetermined tolerance margin, to a predetermined reference value and wherein the reference value is defined as one half the reference voltage utilized by an analog-to-digital converter employed.

42. A process according to claim 39, wherein the first predetermined minimum value is one third the value of the smallest acceptable sum of the signals VR, VG, VB values.

43. A process according to claim 40, wherein the second predetermined minimum value is one half the difference between the value of the smallest acceptable sum of the signal VR, VG, VB values and the value of the smallest of the signals VR, VG, VB.

44. A process according to claim 36, further comprising the following steps:

making a plurality of measurements of VR, VG, VB, using the stored supply current values IR, IG, IB;

calculating the arithmetical mean of the values of the signals VR, VG, VB corresponding to each stored supply current IR, IG, IB;

calculating the minimum and maximum limiting values of the digital signals VR, VG, VB by respectively adding and subtracting to/from said arithmetical mean a predetermined error, selected to suit specific application requirements.

45. A process according to claim 44, further comprising the following steps:

defining reference parameters R, G, B respectively as the ratio of the value of each signal VR, VG, VB to their sum;

calculating, for each reference parameter, an upper limit respectively defined as the ratio of the maximum value of the signal VR, VG, VB considered to the sum of that maximum value plus the minimum values of the other two signals VR, VG, VB.

46. A process according to claim 44, further comprising the following steps:

defining reference parameters R, G, B respectively as the ratio of the value of each signal VR, VG, VB to their sum;

calculating, for each reference parameter, a lower limit respectively defined as the ratio of the minimum value of the signal VR, VG, VB considered to the sum of that minimum value plus the maximum values of the other two signals VR, VG, VB.

47. A process according to claim 35, wherein the recognition step b) includes the following steps:

b1) sequentially illuminating, with the aforesaid three light beams, the detecting surface bearing the color to be recognized;

b2) picking up, by means of the light-receiving element, the light scattered from said illuminated surface;

b3) generating an electric signal proportional to the luminous intensity of the picked-up light, as the detecting surface is being illuminated with each of the three beams and converting said electric signal into digital signal VR', VG', VB';

b4) checking that at least two of the values of the digital signals VR', VG', VB' generated are equal, within a predetermined tolerance margin, to those of the signals VR, VG, VB acquired during step a1)–a41).

48. A process according to claim 47, wherein step b4) includes the following steps:

b41) checking that the digital signals VR', VG', VB' generated are lower than a predetermined saturation value and that their sum is higher a predetermired minimum value and:

b41a) if both of said checks give a positive result, carrying out step b4);

b41b) if at least one of said checks gives a negative result, indicating that the color of the surface being scanned is not recognized.

49. A process according to claim 48, wherein the electric signal are amplified to an amplification level and if the first of the checks of step b41) gives a negative result, a step is carried out to check if the amplification level can be lowered and:

if so, lowering said amplification level by a predetermined interval and iteratively repeating the steps from b41);

if not so, indicating that the color of the surface being scanned is not recognized.

50. A process according to claim 48, wherein the electric signal are amplified to an amplification level and if the second of the checks of step b41) gives a negative result, a step is carried out to check if the amplification level can be raised and:

if so, raising said amplification level by a predetermined interval and iteratively repeating the steps from b41);

if not so, indicating that the color of the surface being scanned is not recognized.

51. A process according to claim 48, wherein step b41a) further includes the following steps:

selecting, from the signals VR', VG', VB', the two signals having the highest values;

defining, for each of the selected signals, a reference variable R', G', B' equal to the ratio of the selected signal to the sum of the signals VR', VG', VB';

checking if each of the reference variables above defined falls within a respective predetermined range of values and:

if the above check gives a positive result for both said variables, indicating that the color is recognized;

if the above check gives a negative result for at least one of said variables, indicating that the color of the surface being scanned is not recognized.

52. A process for discriminating a color range of a surface, characterized in that it comprises the following steps:

i) performing, according to claim 35, a first acquisition of a first color establishing one extreme of a color range to be recognized;

ii) storing the supply current values determined during step i);

iii) performing, according to claim 35 and using said emission current values, a second acquisition of a second color establishing the other extreme of said color range;

iv) checking that the values of the electric signals VR', VG', VB' generated during the recognition step are the same, within a predetermined tolerance margin, as those of the electric signals VR, VG, VB acquired during said acquisition steps.

53. A process for discriminating a plurality of colors on a surface, characterized in that it comprises the following steps:

performing sequentially, according to claim 35, a plurality of acquisitions of a plurality of colors;

each time storing the supply current values determined during the preceding step;

checking that the values of the electric signals VR', VG', VB' generated during the recognition steps are the same, within a predetermined tolerance margin, as those of the electric signals VR, VG, VB acquired during said acquisition steps.

54. A process for discriminating the color of a colored surface, comprising the following steps:

a1) sequentially illuminating an acquisition surface having the color to be discriminated with each of three light beams corresponding to three primary colors, each of said light beams being generated by a respective emission source supplied with a supply current IR, IG, IB;

a2) picking up by means of a light-receiving element the light scattered from the illuminated acquisition surface;

a3) generating an electric signal VR, VG, VB proportional to the luminous intensity of the picked-up light, as the acquisition surface is being illuminated with each of the three beams;

a4) controlling the supply current IR, IG, IB of the emission sources such that at least two of the electric signals VR, VG, VB generated are identical with each other, within a predetermined tolerance margin;

defining, for each of the selected signals, a reference variable R, G, B equal to the ratio of the selected signal to the sum of the signals VR, VG, VB;

a5) acquiring the color of the acquisition surface by memorizing the supply current values IR, IG, IB thus controlled:

b) comparing the color of a detecting surface having the color to be discriminated with said color previously acquired, so that said color of the detecting surface can be recognized.

55. A process according to claim 54, wherein the recognition step b) includes the following steps:

b1) sequentially illuminating, with the aforesaid three light beams, the detecting surface bearing the color to be recognized;

b2) picking up, by means of the light-receiving element, the light scattered from said illuminated surface;

b3) generating an electric signal VR', VG', VB' proportional to the luminous intensity of the picked-up light, as the detecting surface is being illuminated with each of the three beams;

defining, for each of the selected signals, a reference variable R', G', B' equal to the ratio of the selected signal to the sum of the signals VR', VG', VB';

b4) checking that at least two of the values of the reference variable R', G', B' defined are equal, within a predetermined tolerance margin, to those of the reference variable R, G, B acquired during step a1) to a5).

* * * * *